March 19, 1968　　　D. J. BLUNDEN ET AL　　　3,374,008
VEHICLE TIE-DOWN STRUCTURE
Filed July 18, 1966　　　　　　　　　　　　3 Sheets-Sheet 1
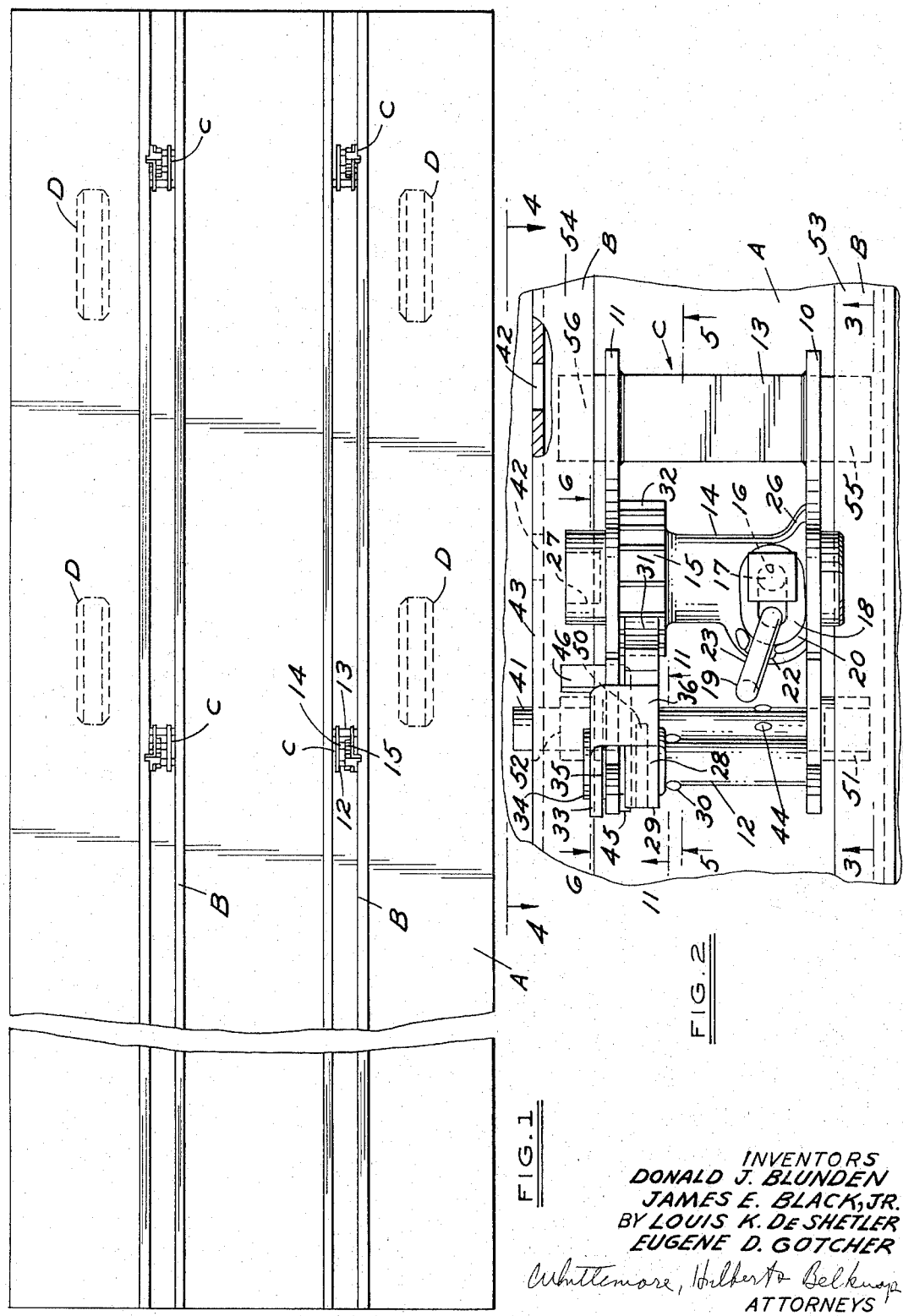
INVENTORS
DONALD J. BLUNDEN
JAMES E. BLACK, JR.
BY LOUIS K. DeSHETLER
EUGENE D. GOTCHER
Whittemore, Hulbert & Belknap
ATTORNEYS

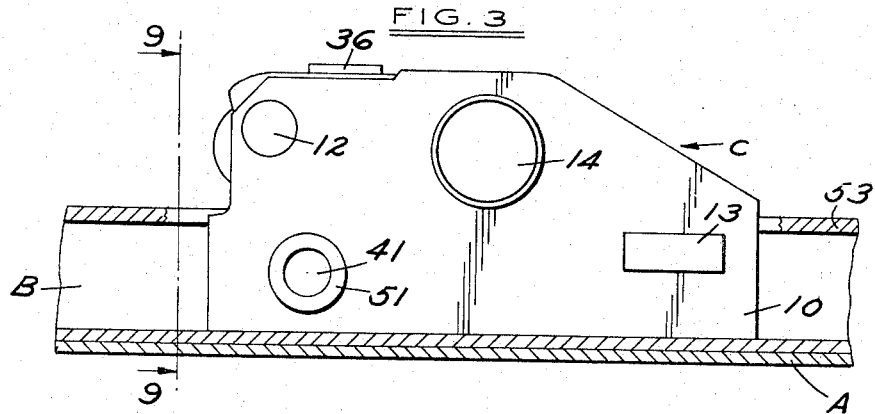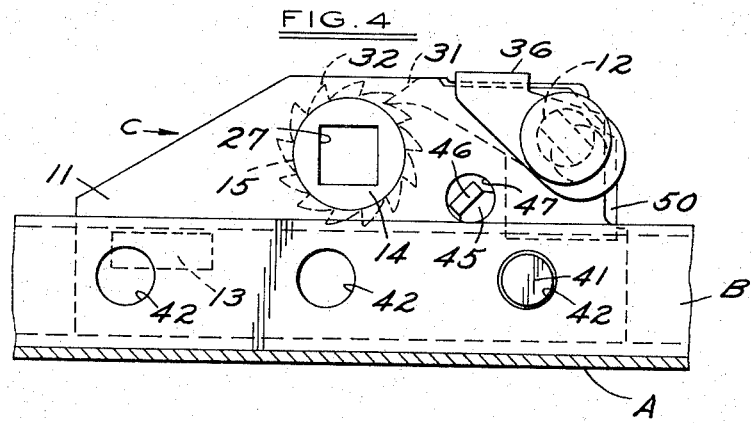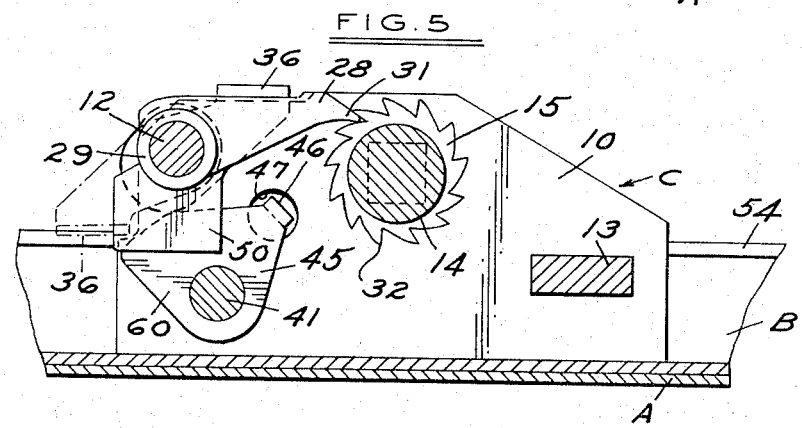

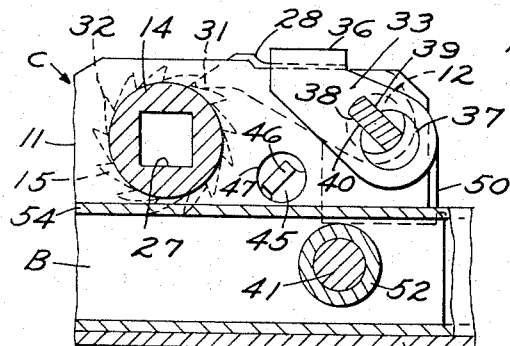
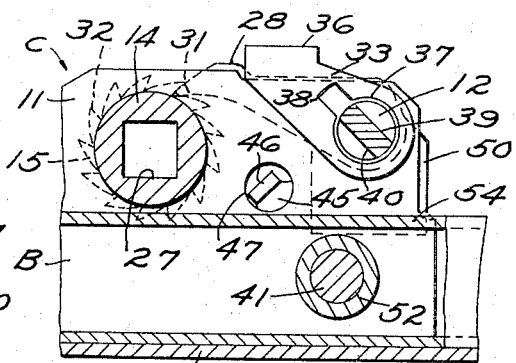
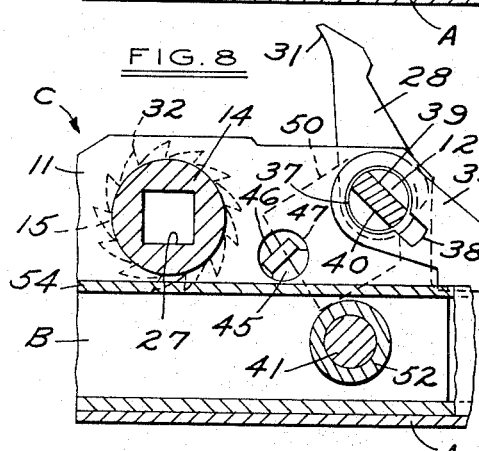
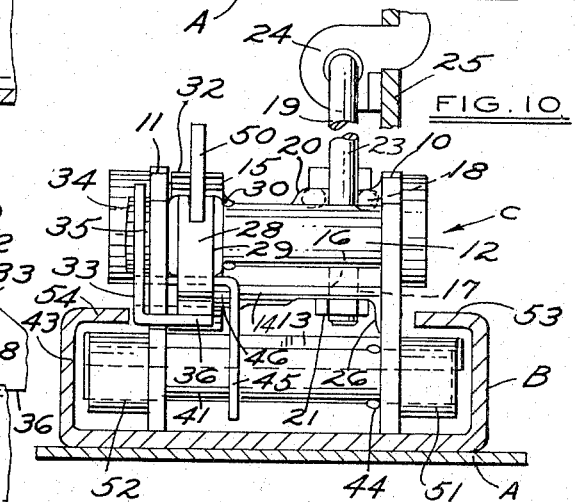
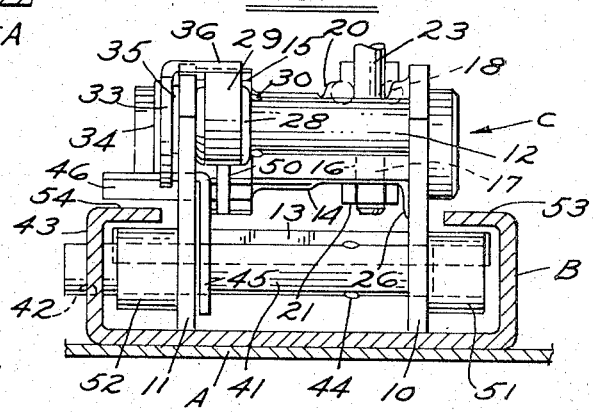
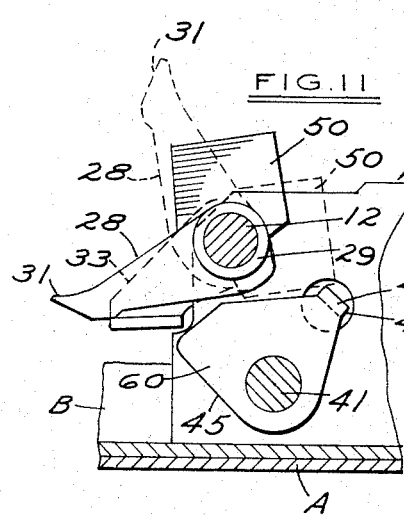

United States Patent Office 3,374,008
Patented Mar. 19, 1968

3,374,008
VEHICLE TIE-DOWN STRUCTURE
Donald J. Blunden, Southfield, James E. Black, Jr., Trenton, Louis K. De Shetler, Allen Park, and Eugene D. Gotcher, Gibraltar, Mich., assignors to Whitehead & Kales Company, River Rouge, Mich., a corporation of Michigan
Filed July 18, 1966, Ser. No. 565,970
8 Claims. (Cl. 280—179)

This invention relates generally to tie-down structures for vehicles, and refers more particularly to improvements upon the structure in United States Patent 3,181,886, dated May 4, 1965.

One of the essential objects of the invention is to provide an improved tie-down structure having a stub shaft movable in one direction transversely of each carriage to an extended position engaging one of a series of longitudinally spaced openings in an upright side wall of a rail to hold the carriage in adjusted position and movable in the opposite direction to a retracted position withdrawn from the opening, and having a pawl rotatably mounted on the carriage and movable from an inoperative position withdrawn from a ratchet gear to an operative position engageable with a selected tooth of the ratchet gear, wherein means are provided for preventing movement of the transversely movable stub shaft in said opposite direction to its retracted position withdrawn from the opening in the upright side wall of the rail when the pawl is in its operative position.

Another object is to provide a flange on the transversely movable stub shaft, and a lug on the pawl disposed alongside the flange in the operative position of the pawl and the extended position of the transversely movable shaft so that the lug is engageable with the flange to prevent movement of the shaft away from its extended position, the lug clearing the flange to permit such movement of the shaft to its retracted position when the pawl is in its inoperative position.

Another object is to provide means for preventing movement of the pawl to its operative position when the transversely movable stub shaft is in its retracted position.

Another object is to provide a lug carried by the transversely movable stub shaft and disposed in the path of the lug on the pawl during movement of the pawl from inoperative toward operative position when the transversely movable shaft is in its retracted position to prevent movement of the pawl to operative position, the lug on the shaft being removed from the path of the lug on the pawl when the shaft is in extended position to permit movement of the pawl to its operative position.

Another object is to provide the carriage with a pair of side walls, one of which is provided with an opening to receive the lug carried by the shaft so as to prevent rotation of the shaft.

Another object is to provide the lug carried by the shaft in such position that it is readily visible to an observer as an indication that the stub shaft is extended through a hole in the upright side wall of the rail and the carriage is locked in adjusted position.

Another object is to provide the flange on the shaft with a portion which is readily accessible to the hand of an operator for moving the shaft between its extended and retracted positions.

Another object is to provide the lug on the pawl so dimensioned that when it engages the lug on the flange the pawl by reason of its weight will fall back to a substantially horizontal out-of-the-way position.

Another object is to provide a tie-down structure that is simple in construction, economical to manufacture, and efficient in use.

Other objects and features of the invention will become apparent as the description proceeds, especially when taken in conjunction with the accompanying drawings, wherein:

FIGURE 1 is a fragmentary top plan view of a longitudinally extending elongated deck of a transport vehicle equipped with a tie-down structure embodying our invention, and showing by dotted lines the positions of four ground engaging wheels of one vehicle supported upon the deck.

FIGURE 2 is an enlarged fragmentary top plan view of a tie-down structure embodying our invention, with parts broken away and in section.

FIGURE 3 is a vertical sectional view taken substantially on the line 3—3 of FIGURE 2.

FIGURE 4 is a vertical sectional view taken substantially on the line 4—4 of FIGURE 2.

FIGURE 5 is a vertical sectional view taken substantially on the line 5—5 of FIGURE 2.

FIGURE 6 is a vertical sectional view taken substantially on the line 6—6 of FIGURE 2.

FIGURE 7 is a vertical sectional view similar to FIGURE 6, but showing the locking dog in raised unlocked position.

FIGURE 8 is a vertical sectional view similar to FIGURE 6, but showing the locking dog swung back to inoperative position and the pawl swung back to an intermediate position.

FIGURE 9 is a vertical sectional view taken on the line 9—9 of FIGURE 2.

FIGURE 10 is a vertical sectional view similar to FIGURE 9, but showing the transversely movable shaft retracted and the pawl and locking dog swung back to inoperative positions.

FIGURE 11 is a vertical sectional view taken substantially on the line 11—11 of FIGURE 2, showing in solid lines the pawl and locking dog swung back to inoperative positions, and showing in dotted lines the pawl in an intermediate position in which a lug carried by the transversely movable shaft engages a lug on the pawl to block further movement of the pawl toward operative position.

Referring now to the drawings, A is a longitudinally extending elongated substantially flat deck of a transport vehicle for vehicles, B are stationary main supporting channels or rails disposed in laterally spaced substantially parallel relation to each other and extending throughout substantially the entire length of said deck, and C are relatively short carriages that are within the main rails B at longitudinally spaced points thereof and are individually adjustable longitudinally of the rails.

Preferably the area of the deck A is such that it is capable of supporting thereon in tandem several vehicles of various sizes, i.e. vehicles having different lengths and/or widths. In the present instance, we have shown in FIGURE 1 an outline of the four ground engaging wheels D of one of the vehicles mentioned.

The parallel main supporting rails B are rigidly secured to and serve effectively as reinforcements for the supporting deck A to prevent such deck from bending or buckling under the load of the vehicles in tandem thereon. Such main supporting rails B also serve as guides for the vehicles while they are being loaded onto or unloaded from the supporting deck A.

The adjustable carriages C are slidable lengthwise of and are supported by the main supporting rails B. Preferably four adjustable carriages C are provided for each vehicle and are arranged in transversely aligned pairs at longitudinally spaced points of the main supporting rails B.

Each adjustable carriage C has laterally spaced inner and outer upright side walls 10 and 11, a transversely extending fixed stub shaft 12 extending through said upright side walls adjacent the upper edges thereof at one end thereof, and a transversely extending fixed crossbar 13 extending through said upright side walls adjacent the lower edges thereof at the opposite end thereof. Such crossbar 13 cooperates with the fixed stub shaft 12 to provide the carriage C with structural elements to maintain the proper spaced relation between the inner and outer side walls 10 and 11 of the carriage C.

Rotatably mounted in the spaced side walls 10 and 11 of each carriage C in spaced parallel relation to the fixed stub shaft 12 is a stub shaft 14 provided at longitudinally spaced points thereof between the inner and outer side walls 10 and 11 of the carriage C with a ratchet gear 15 and a transversely extending opening 16. The ratchet gear 15 is preferably located adjacent the outer side wall 11 of the carriage and is fixed to said stub shaft 14, and the opening 16 is adjacent the inner side wall 10 of the carriage. The opening 16 receives a bolt 17 the head of which clamps the first link 18 of a flexible tie-down chain 19 upon a seat 20 on the stub shaft 14. A nut 21 is threaded on the opposite end of the bolt 17. The stub shaft 14 is provided with a recess 22 in the seat 20 which receives the end of the second link 23 looped through link 18. The chain 19 has a hook 24 at its free end by which the chain may be detachably connected to the frame 25 or other suitable part of a motor vehicle to be tied down.

The ratchet gear 15 is engageable with the outer side wall 11 of the carriage to prevent the rotatable stub shaft 14 from moving transversely of the carriage C in one direction, while an annular flange or collar 26 on the rotatable stub shaft 14 is engageable with the inner side wall 10 of the carriage to prevent the stub shaft 14 from moving transversely of the carriage in the opposite direction. The stub shaft 14 is provided at the outer end thereof with an axially extending outwardly opening polygonal socket 27 for the reception of a correspondingly shaped end portion of an operating crank (not shown) by which the stub shaft 14 may be rotated to cause the tie-down chain 19 to be wound upon the stub shaft 14 and thereby tensioned or tightened when it is desired to tie down a vehicle.

A manually operable pawl 28 is provided at one end with a hub 29 rotatably mounted on the fixed shaft 12 between the outer side wall 11 of the carriage C and staking 30 on the shaft 12, and has a free end portion 31 that is engageable in the operative position of FIGURES 4 and 5 with one of the teeth 32 of the ratchet gear 15 to hold the latter and its supporting shaft 14 against rotation in an anti-clockwise direction (FIGURE 5) when the tie-down chain 19 has been tightened. The pawl 28 is shown in solid lines in FIGURE 11 turned back to inoperative position releasing the ratchet gear 15.

Mounted for both rotary and transverse sliding movements relative to the fixed shaft 12 is a locking dog 33 for the manually operable pawl 28. As shown, this locking dog 33 is located between spaced annular disks or flanges 34 and 35 upon the outer side of the outer upright side wall 11 of the carriage C. The disk 34 is secured to the shaft 12, while the disk 35 is secured to the outer upright side wall 11 of the carriage. Preferably, this locking dog 33 is provided with a laterally projecting arm or flange 36 that is adapted during rotary movement of the locking dog 33 relative to said fixed shaft 12 to extend transversely over and in spaced relation to the upper edge of the pawl 28 when the latter is in engagement with one of the teeth 32 of the ratchet gear 15 (FIGURE 7), and that is adapted upon sliding movement of the locking dog 33 transversely of said shaft 12 to engage and hold the pawl 28 against accidental displacement from the engaged tooth of the ratchet gear 15 (FIGURE 6). As shown, this locking dog 33 has a circular opening 37 to receive the fixed shaft 12 during rotary movement of the locking dog 33 relative to the shaft 12, and has at one edge of the circular opening an elongated slot 38 adapted to receive and straddle diametrically opposed flat portions 39 and 40 of the shaft 12 during sliding movement of the locking dog 33 transversely of said shaft 12 to thereby hold the locking dog 33 against rotation so that the pawl 28 will be maintained in locked position. Thus locking dog 33 may be rotated to and from a position where the laterally projecting arm or flange 36 is spaced above the pawl 28, and then may be slid transversely of the shaft 12 to position the laterally projecting arm or flange 36 in locking engagement with the pawl 28.

Mounted for transverse sliding movement relative to each carriage C is an independent locking stub shaft 41. Preferably this stub shaft 41 is slidable transversely of the carriage C to engage one of a series of longitudinally spaced openings 42 in the outer upright side wall 43 of the main supporting rail B to detachably lock such carriage C in place after the latter has been adjusted lengthwise of the main supporting rail B. The shaft 41 may be slid in one direction to an extended position to project an end thereof through a selected opening 42 in the upright side wall 43 of the rail B (FIGURES 2 and 9), and may be slid in the opposite direction to a retracted position in which the shaft 41 is withdrawn from the opening 42. Staking 44 on shaft 41 prevents movement thereof beyond the retracted position by engagement with the inner side wall 10 of the carriage C.

The shaft 41 has a flange 45 in the form of a flat plate projecting at right angles to the shaft and generally in an upward direction therefrom. The flange 45 is located between the side walls 10 and 11 of the carriage C. In the extended position of the shaft 41 when its end is projected through a selected opening 42 in the upright side wall of the rail (FIGURE 9), the flange 45 is located adjacent to the outer side wall 11 of the carriage. In the retracted position of the shaft 41 when it is withdrawn from the opening 42 (FIGURE 10), the flange 45 is displaced in an inward direction closer to the inner side wall 10 of the carriage.

A lug or pin 46 is secured at one end to the outer edge of the flange 45 and extends transversely of the carriage in parallel relation to the shaft 41. The free end of the lug 46 extends through a hole 47 in the outer side wall 11. The free end of the lug 46 is disposed within the hole 47 in the outer side wall 11 of the carriage both in the extended and retracted positions of shaft 41 to prevent the shaft 41 from rotating.

The pawl 28 is provided with a lug 50 which is in the form of a flat plate extending normal to the fixed stub shaft 12 in parallel relation to the flange 45 on shaft 41. In the operative position of the pawl 28 when its free end portion 31 engages a tooth 32 of the ratchet gear 15, and when the shaft 41 is in its extended position engaged in an opening 42 in the upright side wall 43 of the rail B, the lug 50 of the pawl 28 extends along the inner side of the flange 45 on the shaft and hence prevents inward movement of the shaft 41 away from its extended position shown in FIGURES 2 and 9. Accordingly, when the pawl 28 is in its operative position engaging a tooth 32 of the ratchet gear 15, the shaft 41 cannot be disengaged from the opening 42 in the rail B and therefore the carriage C cannot move with respect to the rail B. In the inoperative position of the pawl 28 shown in solid lines in FIGURE 11, lug 50 clears flange 45 so that shaft 41 can be moved to retracted position.

When the shaft 41 is in its retracted position (FIGURE 10) withdrawn from the opening 42 in the upright side wall 43 of the rail B, the lug 46 on the flange 45 thereof is disposed in the path of the lug 50 on the pawl 28 during movement of the pawl from its inoperative position toward its operative position (see FIGURE 11). Accordingly in the retracted position of the shaft 41, the pawl 28 cannot be moved to its operative position in engagement with a tooth 32 of the ratchet gear 15 because the lug 46 on flange 45 of shaft 41 will engage the lug 50 on the pawl 28 in an intermediate position of the pawl as shown in dotted lines in FIGURE 11 and block further movement of the pawl toward operative position. Accordingly it will be impossible to move the pawl 28 to its operative position until the shaft 41 has been moved to its extended position in which it engages an opening 42 in the rail B to secure the carriage C in fixed position with respect to the rail B. In the extended position of shaft 41 (FIG. 9), lug 46 is removed from the path of pawl 28 so that the pawl can move to operative position.

To prevent the carriage C from becoming disengaged vertically from the rail B, the opposite ends of the stub shaft 41 are provided with sleeves 51 and 52 which are rigidly secured to the side walls 10 and 11 of the carriage C and are beneath and engageable with the inturned flanges 53 and 54 at the upper edges of the rail B. Also, opposite ends 55 and 56 of the crossbar 13 are beneath and engageable with the inturned flanges 53 and 54.

In use, the vehicles to be transported are moved onto the deck A of the transport vehicle from one end thereof to be supported in tandem thereon. Depending upon the location of the carriages C relative to the ground engaging wheels D of the vehicles after the latter are loaded, the respective carriages C may be moved lengthwise of the rails B to positions in spaced relation to said ground engaging wheels D to enable the tie-down chains 19 to be extended upwardly at the proper angles from the shafts 14 for tie-down purposes. During this time, the locking shafts 41 are in their retracted positions. Accordingly, the pawls 28 cannot be swung to their operative positions because of the blocking engagement of lugs 46 on the flanges 45 of the shafts 41 with the lugs 50 on the pawls 28. The locking shafts 41 will then be slid outwardly to extended position into engagement with selected openings 42 in the upright side walls 43 of the rails B to lock the carriages C in adjusted positions. The respective hooks 24 at the free ends of the tie-down chains 19 are then connected to suitable holes in frames 25 of the vehicles. The respective stub shafts 14 are then rotated by cranks (not shown) to tighten or tension the tie-down chains 19 to tie down the vehicles. The respective pawls 28 are then moved to their operative positions in engagement with the selected teeth 32 of the ratchet gears 15 to hold the tie-down chains in tightened condition to thereby hold the vehicles against displacement. The locking dogs 33 are then moved into operative retaining engagement with the pawls 28 to hold the latter against accidental displacement from the selected teeth on the ratchet gears 15. In the operative positions of the pawls 28 in which they engage the ratchet gears 15, the lugs 50 on the pawls extend alongside the inner sides of the flanges 46 on the shafts 41 and thereby positively prevent inward movement of the shafts 41 away from their extended position in which they engage selected openings 42 in the upright side walls 43 of the rails B to secure the carriages C in adjusted position. Hence the carriages C cannot become accidentally disengaged from the rails B while the vehicle is tied down.

In order to release the chains 19 for unloading of the vehicles, the locking dogs 33 are first thrown back to the position of FIGURE 11 to release the pawls 28, and the pawls are then thrown back to their inoperative positions to free the ratchet gears 15. In their inoperative positions, the pawls are substantially horizontal and rest upon the arms 36 of locking dogs 33. Thereafter the transverse stub shafts 41 are moved to their retracted positions (FIG. 10) either by pressing on the outer ends of the shafts 41 or by manually grasping the extension portions 60 of flanges 45 on the shafts.

The lugs 50 on the pawls 28 cooperate with the flanges 45 on the shafts 41 to prevent movement of the shafts 41 from their extended positions in which they positively secure the carriages C to the rails B, when the pawls are in operative position engaging selected teeth 32 of the ratchet gears 15. The lugs 46 on the flanges 45 of shafts 41 cooperate with the lugs 50 on the pawls 28 to prevent the pawls from being moved to operative position in engagement with teeth 32 of the ratchet gears 15 when the shafts 41 are in retracted position withdrawn from the openings 42 in the upright side wall 43 of the rail B.

The lugs 46 on the flanges 45 of shafts 41 prevent the shafts from rotating so that the flanges 45 will extend upwardly from the shafts 41 in positions to cooperate with lugs 50 on the pawls in preventing the shafts from being withdrawn from extended position when the pawls are in operative position, and to insure that the lugs 46 are in the correct positions for preventing the pawls 28 from moving to operative position when the shafts 41 are retracted from the openings 42 in the upright side wall 43 of rail B.

The free ends of the lugs 46 extend through the holes 47 in the outer side walls 11 of the carriages C and are disposed above the inturned flange 53 at the upper edge of the rail B when the shafts 41 are in extended position, and hence such free ends of the lugs 46 are readily visible to an observer to indicate that the shafts 41 are extended through openings 42 in the upright side wall 43 of the rail B and accordingly the carriage C are secured in position.

When the shafts 41 are retracted, the pawls 28 cannot swing clockwise in FIGURE 11 past the dotted line position because of the engagement of lugs 50 on the pawls with lugs 46 on flanges 45 of the shafts. In this position of the pawls 28, they are tilted back sufficiently from an upright position that they will swing anticlockwise by their own weight to the solid line inoperative position of FIGURE 11. In this inoperative position, the pawls 28 are substantially horizontal and low enough that they will not interfere with motor vehicles being loaded or unloaded.

What we claim as our invention is:

1. A vehicle tie-down structure, comprising a longitudinally extending rail adapted to be anchored lengthwise upon a longitudinally extending deck of a transport vehicle and having an upright side wall provided with a plurality of longitudinally spaced openings, a carriage carried by and adjustable lengthwise of said rail, a rotatable stub shaft extending transversely of said carriage, a ratchet gear fixed to said stub shaft, a stub shaft movable in one direction transversely of said carriage to an extended position engaging a selected opening in the upright side wall of said rail to hold said carriage in adjusted position and movable in the opposite direction to a retracted position withdrawn from the opening in the upright side wall of said rail, means for tying down and holding a vehicle after said carriage has been held in adjusted position, including a flexible element connected to said rotatable stub shaft and adapted to be connected to a part of the vehicle, said flexible element being adapted to be wound on said rotatable stub shaft and tensioned thereby during rotation thereof, a pawl rotatably mounted on said carriage and movable from an inoperative position withdrawn from said ratchet gear to an operative position in engagement with a selected tooth of said ratchet gear to hold the latter against rotation after said flexible element has been attached to a vehicle and has been tensioned, and means for preventing movement of said trasversely movable stub shaft in said opposite direction from its extended position and withdrawal thereof from the opening in the upright side wall of said rail when said pawl is in its operative position, said means comprising a flange on said transversely movable shaft, a lug on said pawl disposed alongside said flange in said operative position of said pawl and said extended position of said transversely movable shaft so that upon initial movement of said transversely movable shaft in said opposite direction from its extended position said lug will engage said flange and prevent further movement of said transversely movable shaft in said opposite direction, said lug on said pawl, when said pawl is in inoperative position, clearing said flange to permit movement of said transversely movable shaft in said opposite direction to its retracted position.

2. A vehicle tie-down structure, comprising a longitudinally extending rail adapted to be anchored lengthwise upon a longitudnally extending deck of a transport vehicle and having an upright side wall provided with a plurality of longitudinally spaced openings, a carriage carried by and adjustable lengthwise of said rail, a rotatable stub shaft extending transversely of said carriage, a ratchet gear fixed to said stub shaft, a stub shaft movable in one direction transversely of said carriage to an extended position engaging a selected opening in the upright side wall of said rail to hold said carriage in adjusted position and movable in the opposite direction to a retracted position withdrawn from the opening in the upright side wall of said rail, means for tying down and holding a vehicle after said carriage has been held in adjusted position, including a flexible element connected to said rotatable stub shaft and adapted to be connected to a part of the vehicle, said flexible element being adapted to be wound on said rotatable shaft and tensioned thereby during rotation thereof, a pawl rotatably mounted on said carriage and movable, when said transversely movable shaft is in said extended position, from an inoperative position withdrawn from said ratchet gear to an operative position in engagement with a selected tooth of said ratchet gear to hold the latter against rotation after said flexible element has been attached to a vehicle and has been tensioned, and means for preventing movement of said pawl to its operative position when said transversely movable stub shaft is in retracted position, said means comprising a lug on said pawl, a lug carried by said transversely movable shaft and disposed in the path of said lug on said pawl during movement of said pawl from inoperative toward operative position and when said transversely movable shaft is in its retracted position, said lug on said transversely movable shaft being removed from the path of said lug on said pawl when said transversely moveable shaft is in extended position to permit movement of said pawl to its operative position.

3. A vehicle tie-down structure, comprising a longitudinally extending rail adapted to be anchored lengthwise upon a longitudinally extending deck of a transport vehicle and having an upright side wall provided with a plurality of longitudinally spaced openings, a carriage carried by and adjustable lengthwise of said rail, said carriage having laterally spaced upright inner and outer side walls, a rotatable stub shaft extending transversely of said carriage between said side walls, a ratchet gear fixed to said stub shaft between said side walls, a fixed stub shaft extending between and rigidly secured to said upright side walls at one end of said carriage, a stub shaft movable in one direction transversely of said carriage to an extended position engaging a selected opening in the upright side wall of said rail to hold said carriage in adjusted position and movable in the opposite direction to a retracted position withdrawn from the opening in the upright side wall of said rail, means for tying down and holding a vehicle after said carriage has been held in adjusted position, including a flexible element connected to the rotatable stub shaft and adapted to be connected to a part of the vehicle, said flexible element being adapted to be wound on said rotatable stub shaft and tensioned thereby during rotation thereof, and a pawl rotatably mounted on said fixed shaft and movable from an inoperative position withdrawn from said ratchet gear to an operative position in engagement with a selected tooth of said ratchet gear to hold the latter against rotation after said flexible element has been attached to a vehicle and has been tensioned, a locking dog rotatably mounted on said fixed stub shaft and movable to positions respectively locking said pawl in its operative position and freeing said pawl, a flange on said transversely movable shaft, a lug on said pawl disposed alongside said flange in said operative position of said pawl and said extended position of said transversely movable shaft so that upon initial movement of said transversely movable shaft in said opposite direction from its extended position said lug will engage said flange and prevent further movement of said transversely movable shaft in said opposite direction and thereby prevent withdrawal thereof from the opening in the upright side wall of said rail.

4. The structure defined in claim 3, wherein a lug is provided on said flange extending parallel to said transversely movable shaft and disposed in the path of said lug on said pawl during movement of said pawl from inoperative toward operative position when said transversely movable shaft is in its retracted position to prevent said pawl from moving to its operative position, said lug on said flange being displaced from the path of said lug on said pawl when said transversely movable shaft is in extended position to permit movement of said pawl to its operative position.

5. The structure defined in claim 4, wherein said lug on said transversely movable shaft extends through a hole in one of the side walls of said carriage in all positions of said transversely movable shaft to prevent rotation of the latter.

6. The structure defined in claim 5, wherein said lug on said flange is visible from above said rail and said carriage when said transversely movable shaft is in its extended position to provide an indication to an observer that said transversely movable shaft is in its extended position.

7. The structure defined in claim 6, wherein said flange has a portion accessible to the hand of an operator for moving said transversely movable shaft between its extended and retracted positions.

8. The structure defined in claim 4, wherein said pawl in its inoperative position is disposed substantially horizontally so as not to interfere with a vehicle moving with respect thereto, and said lug on said pawl is so dimensioned that when it engages said lug on said flange said pawl extends upwardly from said fixed shaft but by reason of its weight will fall back to said substantially horizontal inoperative position.

References Cited

UNITED STATES PATENTS

| | | | |
|---|---|---|---|
| 3,038,740 | 6/1962 | Blunden | 280—179 |
| 3,181,886 | 5/1965 | Blunden et al. | 280—179 |

LEO FRIAGLIA, *Primary Examiner.*

J. SIEGEL, *Assistant Examiner.*